United States Patent
Niehsen

(10) Patent No.: US 10,616,555 B2
(45) Date of Patent: Apr. 7, 2020

(54) METHOD AND DEVICE FOR ASCERTAINING AN IMAGE OF THE SURROUNDINGS OF A VEHICLE

(71) Applicant: Robert Bosch GmbH, Stuttgart (DE)

(72) Inventor: Wolfgang Niehsen, Bad Salzdetfurth (DE)

(73) Assignee: Robert Bosch GmbH, Stuttgart (DE)

( * ) Notice: Subject to any disclaimer, the term of this patent is extended or adjusted under 35 U.S.C. 154(b) by 219 days.

(21) Appl. No.: 15/433,861

(22) Filed: Feb. 15, 2017

(65) Prior Publication Data
US 2017/0251195 A1    Aug. 31, 2017

(30) Foreign Application Priority Data

Feb. 25, 2016 (DE) .................. 10 2016 202 948

(51) Int. Cl.
*H04N 13/221* (2018.01)
*H04N 5/357* (2011.01)
(Continued)

(52) U.S. Cl.
CPC ....... *H04N 13/221* (2018.05); *G06K 9/00791* (2013.01); *G06T 7/20* (2013.01);
(Continued)

(58) Field of Classification Search
CPC .... H04N 13/221; H04N 5/357; H04N 13/156; H04N 5/3532; H04N 2013/0085;
(Continued)

(56) References Cited

U.S. PATENT DOCUMENTS

| | | | |
|---|---|---|---|
| 2008/0030587 A1 | 2/2008 | Helbing | |
| 2008/0292211 A1* | 11/2008 | Frantz | G01N 21/8806 382/284 |
| 2012/0072080 A1* | 3/2012 | Jeromin | B60Q 1/143 701/49 |
| 2012/0249744 A1* | 10/2012 | Pesach | H01L 27/14621 348/46 |

(Continued)

FOREIGN PATENT DOCUMENTS

| | | |
|---|---|---|
| DE | 102013220477 A1 | 4/2015 |
| GB | 2483224 | 3/2012 |
| JP | 2012222374 A | 11/2012 |

OTHER PUBLICATIONS

Geyer et al., "Geometric Models of Rolling-Shutter Cameras", EECS Department, University of Berkeley, Mar. 29, 2005, pp. 1-8.
(Continued)

*Primary Examiner* — Joseph Suh
(74) *Attorney, Agent, or Firm* — Norton Rose Fulbright US LLP; Gerard Messina

(57) ABSTRACT

A method for ascertaining an image of the surroundings of a vehicle. The method includes reading in first image data and at least second image data, the first image data representing image data of a first image recording area of a camera in or on a vehicle and the second image data representing image data from a second image recording area of the camera differing from the first image recording area, and the second image data having been recorded chronologically after the first image data. The method further includes processing the second image data using a vehicle parameter and/or driving parameter, to obtain processed second image data. Finally, the method includes combining the first image data with the processed second image data to obtain the image of the surroundings of the vehicle.

10 Claims, 4 Drawing Sheets

(51) Int. Cl.
*G06T 7/579* (2017.01)
*G06T 7/00* (2017.01)
*G06T 7/70* (2017.01)
*H04N 13/156* (2018.01)
*G06K 9/00* (2006.01)
*G06T 7/20* (2017.01)
*G06T 11/60* (2006.01)
*H04N 5/353* (2011.01)
*H04N 13/00* (2018.01)

(52) U.S. Cl.
CPC ............... *G06T 7/579* (2017.01); *G06T 7/70* (2017.01); *G06T 7/97* (2017.01); *G06T 11/60* (2013.01); *H04N 5/357* (2013.01); *H04N 5/3532* (2013.01); *H04N 13/156* (2018.05); *G06T 2207/30252* (2013.01); *G06T 2207/30268* (2013.01); *H04N 2013/0085* (2013.01)

(58) Field of Classification Search
CPC . G06T 7/97; G06T 7/579; G06T 11/60; G06T 7/20; G06T 7/70; G06T 2207/30252; G06T 2207/30268; G06K 9/00791
See application file for complete search history.

(56) References Cited

U.S. PATENT DOCUMENTS

| | | | |
|---|---|---|---|
| 2014/0368651 A1* | 12/2014 | Irschara | G06T 7/00 348/148 |
| 2015/0124088 A1* | 5/2015 | Vera | G08B 13/19632 348/143 |
| 2015/0178884 A1* | 6/2015 | Scholl | G06T 3/0018 348/36 |
| 2016/0140718 A1* | 5/2016 | Ishida | H04N 13/239 345/419 |
| 2017/0124745 A1* | 5/2017 | Christ | G01C 11/04 |
| 2017/0301080 A1* | 10/2017 | Yan | G06T 7/11 |

OTHER PUBLICATIONS

Klein et al., "Parallel Tracking and Mapping on a Camera Phone," IEEE International Symposium on Mixed and Augmented Reality 2009 Science and Technology Proceedings Oct. 19-22, Orlando, FL, pp. 83-86.

Hedborg et al., "Structure and Motion Estimation from Rolling Shutter Video," IEEE International Conference on Computer Vision (ICCV) Workshops, 2011.

* cited by examiner

METHOD AND DEVICE FOR ASCERTAINING AN IMAGE OF THE SURROUNDINGS OF A VEHICLE

RELATED APPLICATION INFORMATION

The present application claims priority to and the benefit of German patent application no. 10 2016 202 948.7, which was filed in Germany on Feb. 25, 2016, the disclosure of which is incorporated herein by reference.

FIELD OF THE INVENTION

The present invention is directed to a method or a device according to the definition of the species in the independent claims. The subject matter of the present invention is also a computer program.

BACKGROUND INFORMATION

Methods are known from the related art with respect to 3D reconstruction using rolling shutter cameras (C. Geyer, M. Meingast, and S. Sastry. Geometric models of rolling shutter cameras. In Proc. 6th OmniVis WS, 2005 and G. Klein and D. Murray. Parallel tracking and mapping on a camera phone. In Proc. ISMAR '09, Orlando, October 2009), which compensate for the influence of the rolling shutter under the assumption of a known 3D geometry of the objects to be reconstructed (for example, fronto-parallel planes). More complex methods are also known from the publication "J. Hedborg, E. Ringaby, P.-E. Forssen, and M. Felsberg. Structure and motion estimation from rolling shutter video. In Proc. IEEE Int. Conf. on Computer Vision (ICCV) Workshops, 2011".

A fundamental method for interpreting image sequences is the 3D reconstruction of the scene on the basis of at least two single images, which provide 2D projections of the scene from different camera positions. In this method, the camera movement is initially estimated from the image sequence data and the 3D coordinates of (static) spatial points are subsequently determined by triangulation (structure from motion, SfM). An important prerequisite for the exact 3D reconstruction of the observed scene is the sufficiently precise determination of the camera egomotion, i.e., of the camera pose (position and orientation) relative to the respective image recording times. At present, however, camera systems using rolling shutter (as compared to high-end camera systems using global shutter) are frequently employed in a variety of applications (driver assistance, safety engineering, robotics, mobile devices, etc.) for, among other things, costs reasons, so that the pixels of different scan rows are exposed and read out at different points in time.

This is generally not taken into consideration, however, when using SfM algorithms for the 3D scene reconstruction, from which systematic 3D reconstruction errors result. Methods, which compensate for the effect of the rolling shutter under the assumption of a known 3D geometry of the objects to be reconstructed (for example, fronto-parallel planes) form the related art with respect to 3D reconstruction using rolling shutter cameras. More complex approaches avoid the inclusion of a priori assumptions about the scene geometry by employing complex computation methods (bundle adjustment), which cannot be efficiently implemented in embedded camera systems (for example, a camera for driver assistance systems in the motor vehicle).

The approach presented herein enables an efficient implementation of a 3D scene reconstruction using rolling shutter cameras. This approach is suitable, in particular, for embedded systems having limited resources and enables a point-by-point 3D reconstruction with no systematic residual errors and requires no previous knowledge about the scene geometry.

SUMMARY OF THE INVENTION

Against this background, a method, in addition to a device which uses this method and, finally, a corresponding computer program as recited in the main claims are provided with the approach presented herein. Advantageous refinements of and improvements on the device specified in the independent claim are possible with the measures listed in the dependent claims.

The approach presented herein provides a method for ascertaining an image (in the sense of a representation or reconstruction) of the surroundings of a vehicle, the method including the following steps:

reading in first image data and at least second image data, the first image data representing image data of a first image recording area of a camera in or on a vehicle and the second image data representing image data from a second image recording area of the camera, which differs from the first image recording area, and the second image data having been recorded chronologically after the first image data.

processing the second image data using a vehicle parameter and/or driving parameter in order to obtain processed second image data; and combining the first image data with the processed second image data in order to obtain the image of the surroundings of the vehicle.

Image data may be understood to mean data of partial images, which are provided in a subsection of an image recording sensor such as, for example, of a camera or the like. An image recording area may be understood to mean a subarea, in which the image sensor is able to capture image data. Such an image recording area may be, for example, a scan row, a scan column or a pixel of the image sensor. A vehicle parameter may be understood to mean, for example, a parameter, which represents a physical variable of a vehicle, of an object or of the object in relation to the vehicle. A driving parameter may be understood to mean a physical variable, which is detectable during the driving of the vehicle. The surroundings of the vehicle may be understood to mean the presence of objects and/or the arrangement of one or several objects in the area, in particular, in relation to the vehicle.

The approach presented herein is based on the finding that an image may be created, in which a distortion forming as a result of the time offset of the first image data relative to the second image data may be compensated for by using the vehicle parameter and/or the driving parameter as well as suitable modelling, and by taking the time-related behavior of the image recording process into account. In this way, it is possible to create an image of the surroundings of the vehicle, which may be used for evaluation in additional driver assistance systems of the vehicle. The approach presented herein offers the advantage that a cost-effective, technically simple image recording sensor may be used for generating the image of the surroundings of the vehicle, whereby the errors, which arise as a result of the corresponding time-offset partial images, may be compensated for during the evaluation of an image thus formed by the processing of the second image data using the vehicle parameter and/or the driving parameter.

One specific embodiment of the approach presented herein is also conceivable, in which in the step of processing, the second image data are processed using a driving speed of the vehicle or using the camera as the driving parameter and/or installation height of the camera in or on the vehicle as the vehicle parameter. The use of a driving parameter and/or vehicle parameter is technically simple to implement on the one hand, and is a well suited variable on the other hand for creating what can be a realistic image of the surroundings of the vehicle in the image.

According to another specific embodiment, image data, which represent an image of a camera scanned by a scan line or a scan column, or which represent a pixel of the camera, may be read in as first and/or second image data in the step of reading in. Such a specific embodiment of the approach provided herein offers the advantage of a very flexible and, therefore, very precise compensation of the location resulting from the time offset of the recording of the first and second image data. At the same time, such first and second image data may be technically very simple to ascertain and without great translation efforts.

One specific embodiment of the approach presented herein is particularly advantageous, in which, in the step of processing, the second image data are processed in order to ascertain image data in an image recording area outside the second image recording area as processed second image data. Such a specific embodiment of the approach presented herein offers the advantage of modification even outside an area of the image, which corresponds to the second image recording area, thereby providing a very flexible and, therefore, very precise option for ascertaining an image, which realistically depicts the surroundings of the vehicle.

Alternatively or in addition, in another specific embodiment of the approach presented herein, a structure of an object in the surroundings of the vehicle detected in the first and/or second image data may be used in the step of processing for ascertaining the processed image data, the detected structure, in particular, being compared to a comparison structure stored in a memory. A structure of an object may be understood to mean, for example, an edge or the like in the first or second image data, which has been detected, for example, using a pattern recognition algorithm. Such a specific embodiment of the approach provided herein offers the advantage of a possible plausibility check when combining the first image data with the processed second image data, so that, for example, a fracture of such an edge may be avoided in the image, which is possibly not present physically.

A specific embodiment of the approach presented herein is also advantageous in which in the step of reading in, at least third image data are read in, which represent image data from a third image recording area of the camera, which differs from the first and from the second image recording area, and the third image data having been recorded chronologically after the first and second image data, the third image data being processed in the step of processing using the vehicle parameter and/or driving parameter, in order to obtain processed third image data, and the first image data being combined in the step of combining with the processed second image data and with the processed third image data in order to obtain the image of the surroundings of the vehicle. Such a specific embodiment of the approach presented herein offers the advantage of a very flexible and, therefore, highly precise option for depicting the surroundings of the vehicle in the image, since a large number of correspondingly processed image data may be used for the combination of the image. This allows an image to be ascertained, which is formed from partial images captured at different points in time, which are represented by the respective image data.

One specific embodiment of the approach presented herein may be very efficiently implemented from a numerical and circuitry-wise perspective, in which the processed second image data are ascertained in the step of processing using a linear system of differential equations.

The approach presented herein also provides a method for detecting objects in the surroundings of a vehicle, the method including the following steps:
  reading in an image which has been ascertained according to a method corresponding to a specific embodiment presented herein; and
  evaluating the read-in image using at least one pattern recognition algorithm in order to detect the object in the surroundings of the vehicle.

With such a specific embodiment of the approach presented here as well, the advantages may be rapidly and technically efficiently implemented.

These methods may, for example, be implemented in software or hardware or in a mixed form of software and hardware, for example, in a control unit or in a device.

The approach presented herein also provides a device, which is configured to carry out, to control and to implement the steps of a variant of a method presented herein in corresponding units. With this embodiment variant of the present invention in the form of a device, the object underlying the present invention may also be rapidly and efficiently achieved.

For this purpose, the device may include at least one processing unit for processing signals or data, at least one memory unit for storing signals or data, at least one interface to a sensor or to an actuator for reading in sensor signals of the sensor or for outputting data signals or control signals to the actuator and/or at least one communication interface for reading in or outputting data, which are embedded in a communication protocol. The processing unit may, for example, be a signal processor, a microcontroller or the like, whereby the memory unit may be a flash memory, an EPROM or a magnetic memory unit. The communication interface may be configured to read in or output data in a wireless and/or wired manner, a communication interface able to read in or output the wired data, being able to read in these data, for example, electrically or optically from a corresponding data transmission line or of outputting into a corresponding data transmission line.

A device in the present case may be understood to be an electrical device, which processes sensor signals and outputs control signals and/or data signals as a function thereof. The device may include an interface, which may be configured in hardware and/or in software. In a hardware design, the interfaces may, for example, be part of a so-called ASIC, which contains a wide variety of functions of the device. It is also possible, however, that the interfaces are individual, integrated circuits or are made at least partially of discrete components. In a software design, the interfaces may be software modules, which are present, for example, on a microcontroller in addition to other software modules.

In one advantageous embodiment, the device controls an image processor employed in a vehicle in order to evaluate a camera image of the surroundings of the vehicle and thereby provide image signals for additional driver assistance systems such as, for example, a collision detection unit. For this purpose, the device may access sensor signals, such as image data of the camera as an image sensor. The combined image may then be output to an image processor, for example, in which objects in the ascertained image are detected, which may be used, for example, in the case of the collision detection to activate a passenger protection arrangement, such as an airbag or a seatbelt tightener.

Also advantageous is a computer program product or computer program having program code, which may be stored on a machine-readable medium or memory medium, such as a semiconductor memory, a hard disk memory or an optical memory, and may be used for carrying out, implementing and/or controlling the steps of the method according to one of the specific embodiments described above, in particular, if the program product or program is executed on a computer or on a device.

Exemplary embodiments of the present invention are depicted in the drawings and are described in greater detail in the following description.

In the following description of exemplary embodiments of the present invention, identical or similar reference numerals are used for elements which are represented in the various figures and act similarly, a repeated description of these elements being omitted.

DETAILED DESCRIPTION

Figure 1:
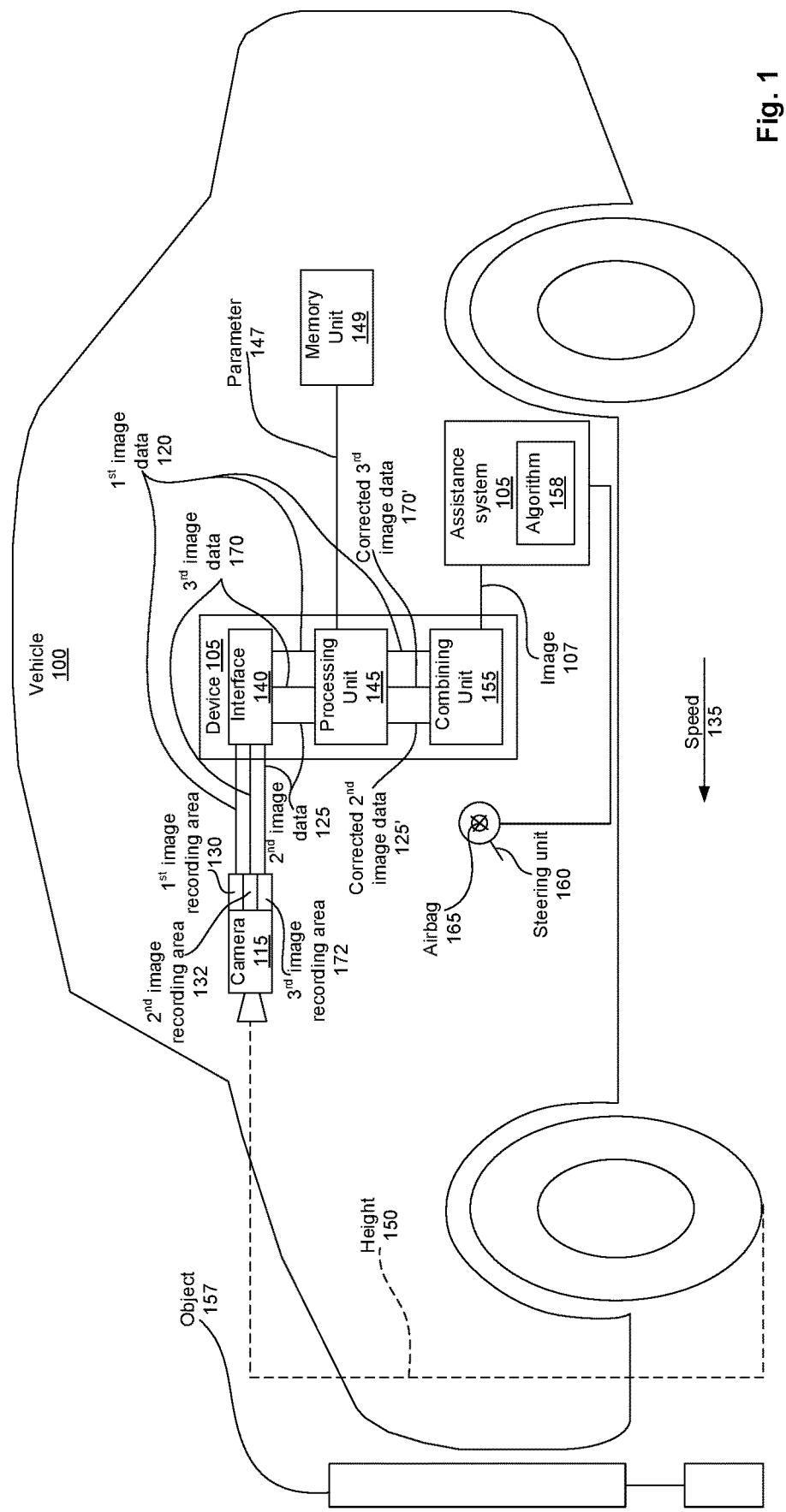
FIG. 1 shows a block diagram of a vehicle including an exemplary embodiment of a device for ascertaining an image of the surroundings of a vehicle.

FIG. 1 shows a block diagram of a vehicle 100, including one exemplary embodiment of a device 105 for ascertaining an image 107 of surroundings 110 of a vehicle 100. Vehicle 100 also includes a camera 115 as a visual image sensor, camera 115 being configured to provide first image data 120 and second image data 125. First image data 120 are provided by a first image recording area 130, whereas second image data 125 are provided by a second image recording area 132 of camera 115. Image recording areas 130 and 132 are different subsections of an image capture sensor of camera 115 and may portray different sections or viewing angles of camera 115 of surroundings 110 pictorially in image 107. In cost-efficient cameras 115, which may be intended for use in the approach presented herein, first image data 120 are also provided earlier than second image data 125. If vehicle 100 then travels at driving speed 135, second image data 125 are recorded from another perspective of camera 115 on surroundings 110, so that when first image data 120 are then combined with second image data 125, a perspective distortion occurs, which significantly complicates a processing of an image 107 of surroundings 110 formed in this way, for example, for a driver assistance system 137, or even makes it impossible.

To ensure that cost-efficient components like such a camera 115, for example, in the form of a rolling shutter camera, may be used in the vehicle segment, device 105 for ascertaining image 107 of surroundings 110 of vehicle 100 is then used, in which a correction of second image data 125 provided chronologically subsequently takes place, so that the processed, i.e., corrected, second image data 125' may then be combined with first image data 120 to form image 107, which may then be made available, for example, to driver assistance system 137.

To ensure this functionality, device 105 includes a read-in interface 140, via which first image data 120 and second image data 125 are read in. First image data 120 and second image data 125 are subsequently forwarded by read-in interface 140 to a processing unit 145. Second image data 125 are then processed in processing unit 145 using a vehicle parameter and/or driving parameter 147, which is downloaded, for example, from a memory unit 149 of vehicle 100 into processing unit 145. Vehicle parameter and/or driving parameter 147 may, for example, represent driving speed 135 of vehicle 100 and/or an installation height 150 of camera 115 in vehicle 100, for example, in relation to the plane of the roadway. For processing second image data 125, processing unit 145 may also use a time period, for example, which corresponds to the time difference between the recording of the first image data by the image recording sensor in camera 115 compared to the recording of second image data 125 by the image recording sensor in camera 115. It then becomes possible to process second image data 125 in such a way that processed second image data 125' are obtained, which have been "calculated back" to the point in time in which first image data 120 were recorded. Processed second image data 125', as well as first image data 120 are then forwarded to a combining unit 155, in which image 107, which then very realistically reflects surroundings 110 in their entirety very well approximated to the point in time of the recording of first image data 120 by the image recording sensor of camera 115, is then ascertained based on processed second image data 125' and first image data 120.

This image 107 may then be further processed, for example, in driver assistance system 137, in order, for example, to detect objects 157 from this image 107, such as a road marker ahead of vehicle 100 or the traffic lane on the road ahead of vehicle 100, with the aid of a pattern recognition algorithm 158. This then enables driver assistance system 137 to assist in or to automatically perform the steering of vehicle 100 via steering unit 160 and/or the activation of the passenger protection arrangement such as, for example, a driver airbag 165 in the event that a directly imminent collision with object 157 is detected from image 107.

According to another exemplary embodiment of the approach presented herein, camera 115 may also provide third image data 170 from an image recording area 172 differing from first image recording area 130 and from second image recording area 132, which is then read in by read-in interface 140 and forwarded to processing unit 145. Third image data 170 were then recorded or provided by camera 115, for example, as third read-out row or as third read-out pixel chronologically after first image data 120 and second image data 125. Third image data 170 are then processed in processing unit 145 using vehicle parameter and/or driving parameter 147, in order to obtain processed third image data 170', which are then conveyed to combining unit 155. First image data 120 are then combined in combining unit 155 with processed second image data 125' and processed third image data 170' in order to obtain image 107 of surroundings 110 of vehicle 100. In this way, it is possible to achieve an even further improved compensation of the distortions in the available image data caused by the chronological delay, which is related, for example, to the delayed read out of the rolling shutter.

One aspect of the approach presented herein is in the efficient modelling of the camera egomotion using quaternions and the simultaneous estimation of the camera egomotion on which they are based for each scan row or, if necessary, also each pixel and the point-by-point 3D scene geometry. This method leads to a system of linear differential equations for the rotation of camera 115 and for the translation of camera 115, which may be robustly solved and with high convergence speed using suitable numerical processes. In contrast, classical approaches based on Euler angles result in non-linear differential equations with singular points, which impair the convergence behavior in the numerical integration. The approach presented herein, for example, offers a point-by-point 3D reconstruction of the observed scene of surroundings 110 without systematic residual errors due to the rolling shutter distortions of the single images or partial images of the image sequence contained in image data 120 and 125. In addition, the approach presented herein enables a smooth transition of the use of global shutter cameras to rolling shutter cameras in vehicles and provides an efficient method for rectification or for rolling shutter compensation of the individual images or partial images in image data 120 and 125, so that subsequent processing methods in the signal flow such as, for example, in driver assistance system 137, may be implemented without further consideration given to rolling shutter effects.

Figure 2:
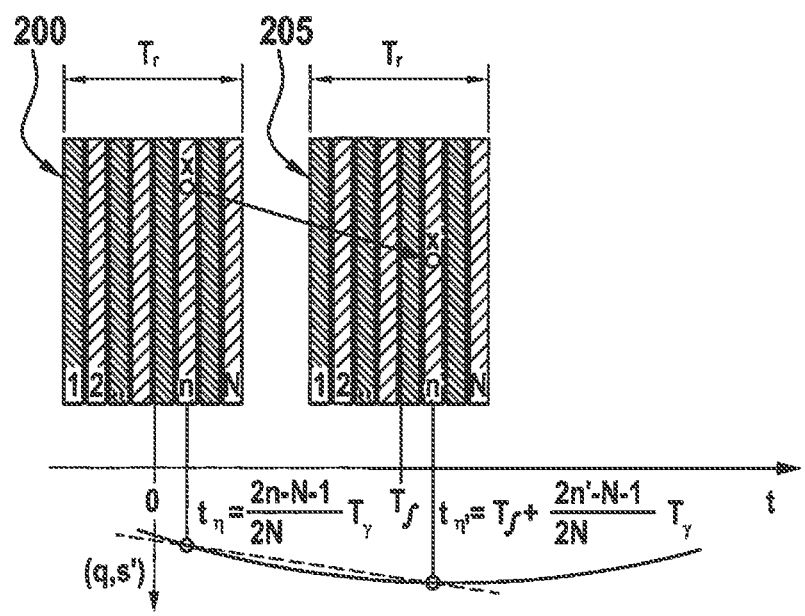
FIG. 2 schematically shows a representation of the chronological relationships of two chronologically adjacent images and of an image sequence as exemplified by a rolling shutter camera as a camera in the vehicle.

FIG. 2 schematically shows a representation of the chronological relationships for two chronologically adjacent images 200 and 205 of an image sequence by way of example of a rolling shutter camera as camera 115 in vehicle 100 as a function of time t. In this case, the images are read out in a read-out time $T_r$ per image, this read-out time being subdivided into N frame time intervals of time period $T_f$. In this exemplary embodiment, it is assumed that the pixels of each of n=N scan rows 210 are simultaneously exposed and read out. It should be noted, however, that the following statements may be directly applied to the case of a rolling shutter camera, which has different exposure times and read-out times for parts of scan rows or, in border-line cases, for each pixel. In the case of directory correction of the optics, the rolling shutter camera considered here in general also results in a dependency of the pixel time stamps both on the row index and on the column index of the pixel considered, which in turn, however, may be directly considered by a simple extension of the described approach.

In this case, the rotation equation of camera 115 may be specified as $$q = \exp(\dot{\varphi}(t'-t)n)$$

and the translation equation of camera 115 as $$s' = v'(t'-t)$$

With the variables introduced in FIG. 2, it is possible to fully describe the camera egomotion for sufficiently smooth trajectories (see below in FIG. 2) using a system of linear differential equations $$\dot{q} = \tfrac{1}{2}\Omega q_0$$

$$\dot{t}' = v'$$

with the unit quaternion q for describing the camera rotation and the translation vector t', it being assumed that the angular speed according to the absolute value (dφ/dt) and direction (n) and the vector of the translation speed ($v^1$) in the observed time interval are constant. Under these assumptions, the skew symmetric (3×3) matrix Ω of the rotation rates measured in the camera coordination system is also constant, so that the given system of differential equations may be analytically solved and implemented as indicated above.

With this modelling, it is possible to easily apply the egomotion of a global shutter camera as specified in FIG. 2 to the egomotion of a rolling shutter camera. In the case of the aforementioned characteristics of a rolling shutter camera, in which the pixel time stamps are a function of both the row index as well as the column index, the specified models of the camera egomotion may be immediately generalized, by extending the time differences $$\delta t(n,n') = t'(n') - t(n)$$

$$\delta t(n,m,n',m') = t'(n',m') - t(n,m)$$

The application of these models of the camera egomotion to the SfM-based 3D reconstruction of the observed scene results in a point-by-point 3D reconstruction which, however, initially exists only with respect to the respective chronologically modifiable camera coordinate system. For the subsequent processing steps, however, it is advantageous to relate the point-by-point 3D reconstruction to a shared reference camera coordinate system having a fixed reference time stamp. Provided for this purpose are, in particular, the reference time stamps ($k \times T_f$) specified in FIG. 2, which exist due to the respective average read-out time of a frame.

For the 3D reconstruction with respect to the reference camera coordinate system, it is sufficient to utilize the specified model of the camera egomotion for the back projection of a 3D point (P) at point in time (t) to reference point in time ($t_{ref} = k \times T_f$), the aforementioned time differences to be replaced merely by ($\delta t = t - t_{ref}$). With the corresponding rotation matrix (R=R(δt)) and the associated translation vector (s'=s'(δt)), this initially leads to $$P(t) = R(\delta t) P(t_{ref}) + s'(\delta t)$$

and ultimately to the targeted back projection $$P(t_{ref}) = R^T(\delta t) P(t) - s'(\delta t)$$

Figure 3:
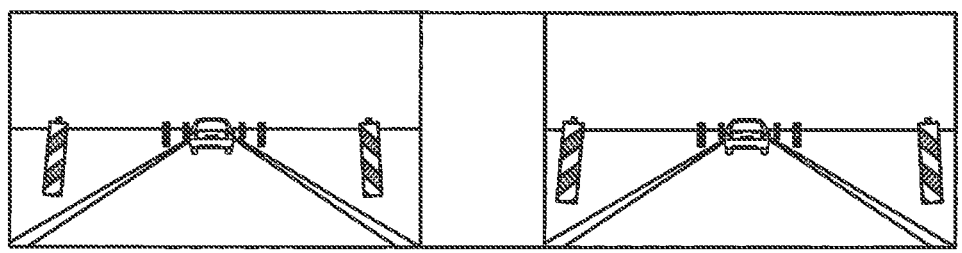
FIG. 3 shows a synthetic scene (here a construction site) based on two frames as images for illustrating the approach presented herein.

FIG. 3 shows a synthetic scene based on two frames (here a construction site) as images 107 for illustrating the approach presented herein, a rolling shutter camera in vehicle 100 moving at $V_{cam}$=80 km/h on a road with road markers positioned at the side at a distance of every 15 m as objects 157. Installation height 150 of camera 115 is 1.2 m, the resolution is 1280×720 pixels and the horizontal aperture angle is 50°. The image refresh rate is 25 fps corresponding to $T_f$=40 ms. The read-out time of the rolling shutter is $T_r$=35 ms. The influence of the rolling shutter is clearly apparent, in particular, in the right hand image from FIG. 3, since the road markers standing perpendicular to the roadway surface as objects 157 are increasingly cropped as the distance to camera 115 decreases.

Figure 4:
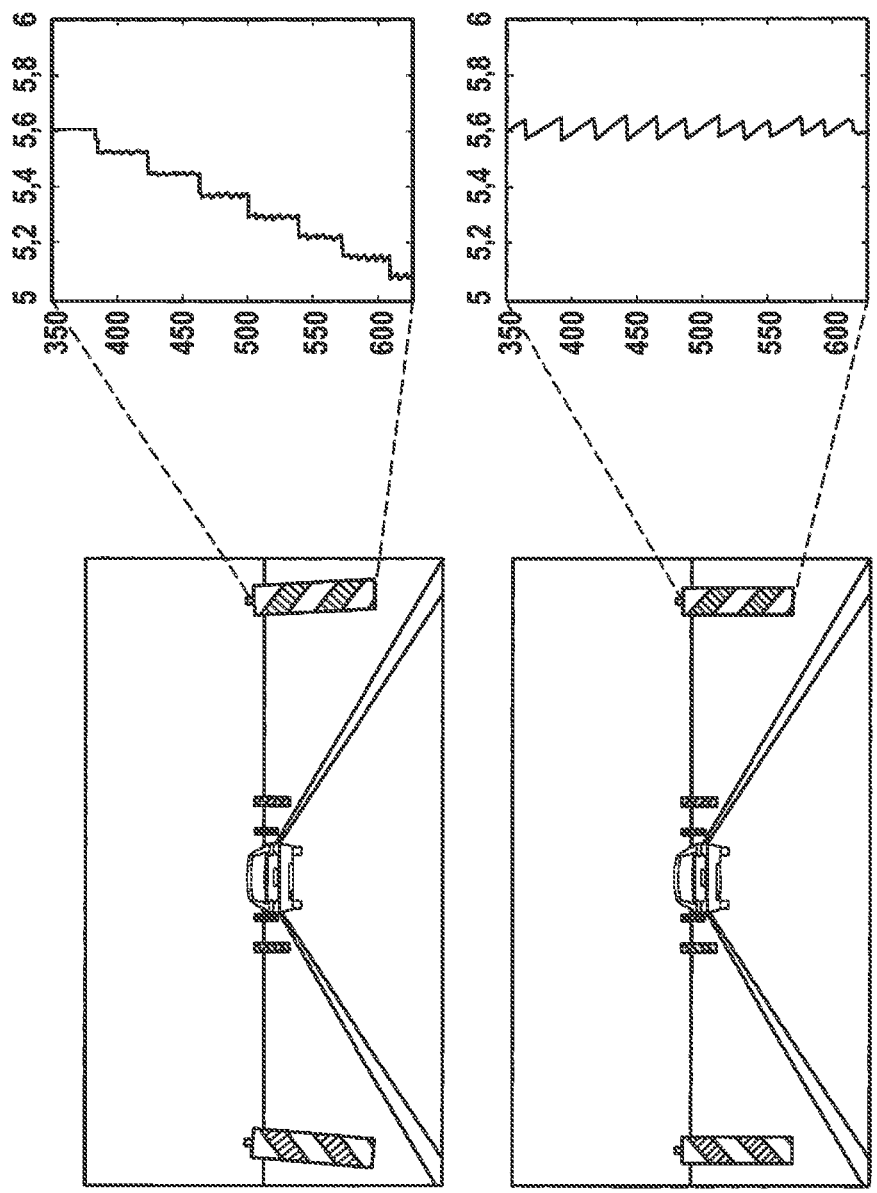
FIG. 4 shows two partial images situated one on top of the other as images in which the upper partial image has been reconstructed or combined without the use of the approach presented herein and the lower image has been reconstructed or combined using the approach presented herein.

The effectiveness of the approach presented herein is illustrated in FIG. 4.

FIG. 4 shows two partial images situated on top of one another as images 107, in which the upper partial image has been reconstructed and combined without the use of the approach presented herein, and the lower partial image has been reconstructed and combined using the approach presented herein. The distances of object 157 with a row-by-row readout of image sensor of camera 115 in this case are depicted in the right upper illustration as the distance of the object as a function of the read-out rows. The partial image of FIG. 4 depicted on the bottom left side shows the reconstruction of the right hand image from FIG. 3 for the reference point in time $t_{ref}=T_f$. As is apparent, the road markers as objects 157 now exhibit the correct perpendicular orientation in the entire image field of the image, i.e., the influence of the rolling shutter has been fully compensated for, so that subsequent processes, for example, in driver assistance system 137, may be applied without explicit consideration given to rolling shutter effects. The diagram depicted at the bottom right in FIG. 4 again shows the distances of object 157 with a row-by-row readout of the image sensor of camera 115, the image data read out chronologically later now having been processed and, therefore, having been calculated back to a uniform readout point in time. In turn, the (now arithmetically corrected) distance of the object as a function of the read-out rows is depicted in the bottom right illustration.

FIG. 4 further depicts the SfM-based 3D reconstruction of the first road marker as object 157 on the right side of the roadway with and without compensation of the rolling shutter. As expected, the non-compensated 3D reconstruction (top right in FIG. 4) exhibits a clear dependence of the distance of the road marker as object 157 on the considered scan row. In contrast, the distance of the road marker as object 157 in the case of the RS compensated SfM reconstruction (bottom right in FIG. 4) is correctly estimated, except for a stochastic error resulting from the quantization of the pixel correspondences.

Figure 5:
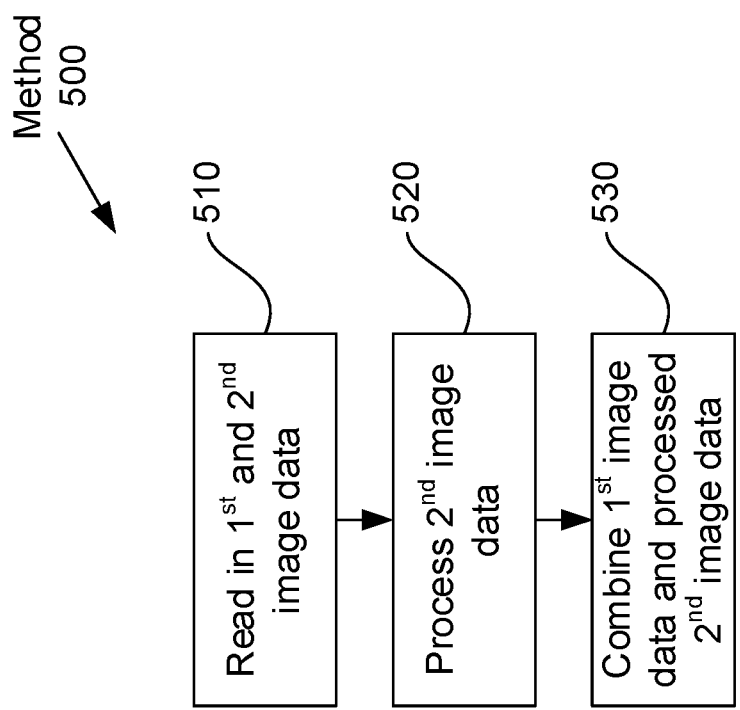
FIG. 5 shows a flow chart of a method according to one exemplary embodiment.

FIG. 5 shows a flow chart of a method 500 for ascertaining an image of the surroundings of a vehicle. The method includes a step 510 of reading in first image data and at least second image data, the first image data representing image data of a first image recording area of a camera in or on a vehicle, and the second image data representing data from a second image recording area of the camera differing from the first image recording area, and the second image data having been recorded chronologically after the first image data. Method 520 further includes a step of processing the second image data using a vehicle parameter and/or driving parameter, in order to obtain processed second image data. Finally, method 500 includes a step 530 of combining the first image data with the processed second image data in order to obtain the image of the surroundings of the vehicle.

Figure 6:
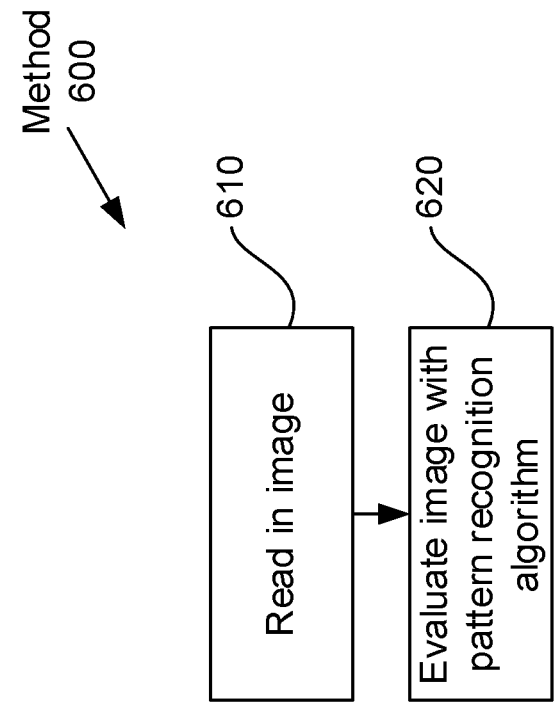
FIG. 6 shows a flow chart of a method according to one exemplary embodiment.

FIG. 6 shows a flow chart of a method 600 for detecting objects 157 in the surroundings 110 of a vehicle 100. Method 600 includes a step 610 of reading in an image, which has been ascertained according to a previously described exemplary embodiment corresponding to a method 500. Method 600 further includes a step 620 of evaluating the read-in image using at least one pattern recognition algorithm in order to detect the object in the surroundings of the vehicle. This method 600 may then be carried out, for example, in driver assistance system 137 in order to detect objects contained in image 107 with the aid of pattern recognition algorithm 158.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for ascertaining an image of surroundings of a vehicle based on image captures of a camera that (a) is in or on the vehicle, (b) includes a sensor composed of a plurality of sensing regions, (c) captures, at a first point in time, a first image composed of a first plurality of data elements, and (d) captures, at a second point in time, a second image composed of a second plurality of data elements, wherein the capture of the first and second images occurs by each and every one of the plurality of sensing regions sensing a respective one of the first plurality of data elements and sensing a respective one of the second plurality of data elements, the method comprising:
   of the first plurality of data elements that formed the first image, reading in from the camera only a first subset, which is less than all, of the first plurality of data elements of the first image, wherein the first subset of the first plurality of data elements were sensed by only a first subset, which is less than all, of the sensing regions of the sensor, wherein a remainder, other than the first subset, of the first plurality of data elements that formed the first image, which were sensed by other ones of the sensing regions, are not read in;
   of the second plurality of data elements that formed the second image, reading in from the camera only a subset, which is less than all, of the second plurality of data elements of the second image, wherein the subset of the second plurality of data elements were sensed by only a second subset of the of the sensing regions of the sensor, wherein the second subset of the sensing regions is different than the first subset of the sensing regions and wherein a remainder, other than the subset, of the second plurality of data elements that formed the second image, which were sensed by those of the sensing regions other than the second subset of the sensing regions, are not read in;
   processing the read in subset of the second plurality of data elements using one or both of a vehicle parameter and a driving parameter to obtain an estimate of a second subset, which is less than all, of the first plurality of data elements of the first image, which were sensed by the second subset of the sensing regions of the sensor; and
   combining the first subset of the first plurality of data elements with the processed subset of the second plurality of data elements to obtain at least a part of the image of the surroundings of the vehicle.

2. The method of claim 1, wherein, in the processing, the read in subset of the second plurality of data elements are processed using one or both of (a) a driving speed of the vehicle or of the camera as the driving parameter and (b) an installation height of the camera in or on the vehicle as the vehicle parameter.

3. The method of claim 1, wherein the first and second subsets of the sensing regions are respective scan rows, scan columns, or pixels of the sensor of the camera.

4. The method of claim 1, wherein, in the processing, a structure of an object in the surroundings of the vehicle detected in one or both of (a) the first subset of the first plurality of data elements and (b) the read in subset of the second plurality of data elements is used to ascertain the processed subset of the second plurality of data, the detected structure being compared to a comparison structure stored in a memory.

5. The method of claim 1, wherein, in the processing, the processed subset of the second plurality of data is ascertained using a system of linear differential equations.

6. The method of claim 1, further comprising:
of a third plurality of data elements that formed a third image that had been captured at a third point in time by the plurality of sensing regions of the sensor of the camera, reading in from the camera only a subset of the third plurality of data elements of the third image, which were sensed by only a third subset of the sensing regions of the sensor, wherein the third subset of the sensing regions is different than each of the first and second subsets of the sensing regions and wherein a remainder of the third plurality of data elements that formed the third image, which were sensed by those of the sensing regions other than the third subset of the sensing regions, are not read in;
processing the read in subset of the third plurality of data elements using the one or both of the vehicle parameter and the driving parameter to obtain an estimate of a third subset of the first plurality of data elements of the first image sensed by the third subset of the sensing regions of the sensor; and
combining the processed subset of the third plurality of data elements with the combination of the first subset of the first plurality of data elements and the processed subset of the second plurality of data elements image data to obtain another part of the image of the surroundings of the vehicle.

7. A method for detecting an object in surroundings of a vehicle based on image captures of a camera that (a) is in or on the vehicle, (b) includes a sensor composed of a plurality of sensing regions, (c) captures, at a first point in time, a first image composed of a first plurality of data elements, and (d) captures, at a second point in time, a second image composed of a second plurality of data elements, wherein the capture of the first and second images occurs by each and every one of the plurality of sensing regions sensing a respective one of the first plurality of data elements and sensing a respective one of the second plurality of data elements, the method comprising:
of the first plurality of data elements that formed the first image, reading in from the camera only a first subset, which is less than all, of the first plurality of data elements of the first image, wherein the first subset of the first plurality of data elements were sensed by only a first subset, which is less than all, of the sensing regions of the sensor, wherein a remainder, other than the first subset, of the first plurality of data elements that formed the first image, which were sensed by other ones of the sensing regions, are not read in;
of the second plurality of data elements that formed the second image, reading in from the camera only a subset, which is less than all, of the second plurality of data elements of the second image, wherein the subset of the second plurality of data elements were sensed by only a second subset of the of the sensing regions of the sensor, wherein the second subset of the sensing regions is different than the first subset of the sensing regions and wherein a remainder, other than the subset, of the second plurality of data elements that formed the second image, which were sensed by those of the sensing regions other than the second subset of the sensing regions, are not read in;
processing the read in subset of the second plurality of data elements using one or both of a vehicle parameter and a driving parameter to obtain an estimate of a second subset, which is less than all, of the first plurality of data elements of the first image, which were sensed by the second subset of the sensing regions of the sensor;
combining the first subset of the first plurality of data elements with the processed subset of the second plurality of data elements to obtain at least a part of an image of the surroundings of the vehicle; and
evaluating the image of the surroundings of the vehicle constructed by the combining, wherein the evaluating is performed using at least one pattern recognition algorithm to identify the object in the surroundings of the vehicle.

8. A device for ascertaining an image of surroundings of a vehicle based on image captures of a camera that (a) is in or on the vehicle, (b) includes a sensor composed of a plurality of sensing regions, (c) captures, at a first point in time, a first image composed of a first plurality of data elements, and (d) captures, at a second point in time, a second image composed of a second plurality of data elements, wherein the capture of the first and second images occurs by each and every one of the plurality of sensing regions sensing a respective one of the first plurality of data elements and sensing a respective one of the second plurality of data elements, the device comprising a processor, wherein the processor is configured to:
of the first plurality of data elements that formed the first image, read in from the camera only a first subset, which is less than all, of the first plurality of data elements of the first image, which wherein the first subset of the first plurality of data elements were sensed by only a first subset, which is less than all, of the sensing regions of the sensor, wherein a remainder, other than the first subset, of the first plurality of data elements that formed the first image, which were sensed by other ones of the sensing regions, are not read in;
of the second plurality of data elements that formed the second image, read in from the camera only a subset, which is less than all, of the second plurality of data elements of the second image, which wherein the subset of the second plurality of data elements were sensed by only a second subset of the of the sensing regions of the sensor, wherein the second subset of the sensing regions is different than the first subset of the sensing regions and wherein a remainder, other than the subset, of the second plurality of data elements that formed the second image, which were sensed by those of the sensing regions other than the second subset of the sensing regions, are not read in;
process the read in subset of the second plurality of data elements using one or both of a vehicle parameter and a driving parameter to obtain an estimate of a second subset, which is less than all, of the first plurality of data elements of the first image, which were sensed by the second subset of the sensing regions of the sensor; and
combine the first subset of the first plurality of data elements with the processed subset of the second plurality of data elements to obtain at least a part of the image of the surroundings of the vehicle.

9. A non-transitory computer readable medium on which are stored instructions that are executable by a processor and that, when executed by the processor, cause the processor to perform a method for ascertaining an image of surroundings of a vehicle based on image captures of a camera that (a) is in or on the vehicle, (b) includes a sensor composed of a plurality of sensing regions, (c) captures, at a first point in time, a first image composed of a first plurality of data elements, and (d) captures, at a second point in time, a second image composed of a second plurality of data elements, wherein the capture of the first and second images occurs by each and every one of the plurality of sensing regions sensing a respective one of the first plurality of data elements and sensing a respective one of the second plurality of data elements, the method comprising:

of the first plurality of data elements that formed the first image, reading in from the camera only a first subset, which is less than all, of the first plurality of data elements of the first image, wherein the first subset of the first plurality of data elements were sensed by only a first subset, which is less than all, of the sensing regions of the sensor, wherein a remainder, other than the first subset, of the first plurality of data elements that formed the first image, which were sensed by other ones of the sensing regions, are not read in;

of the second plurality of data elements that formed the second image, reading in from the camera only a subset, which is less than all, of the second plurality of data elements of the second image, wherein the subset of the second plurality of data elements were sensed by only a second subset of the of the sensing regions of the sensor, wherein the second subset of the sensing regions is different than the first subset of the sensing regions and wherein a remainder, other than the subset, of the second plurality of data elements that formed the second image, which were sensed by those of the sensing regions other than the second subset of the sensing regions, are not read in;

processing the read in subset of the second plurality of data elements using one or both of a vehicle parameter and a driving parameter to obtain an estimate of a second subset of the first plurality of data elements of the first image, which were sensed by the second subset, which is less than all, of the sensing regions of the sensor; and combining the first subset of the first plurality of data elements with the processed subset of the second plurality of data elements to obtain at least a part of the image of the surroundings of the vehicle.

10. The method of claim 9, wherein, in the processing, the read in subset of the second plurality of data elements are processed using one or both of (a) a driving speed of the vehicle or of the camera as the driving parameter and (b) an installation height of the camera in or on the vehicle as the vehicle parameter.

* * * * *